(12) United States Patent
Eade et al.

(10) Patent No.: US 11,699,225 B2
(45) Date of Patent: Jul. 11, 2023

(54) TIRE SENSING AND ANALYSIS SYSTEM (71) Applicant: Get Spiffy, Inc., Durham, NC (US)

(72) Inventors: Ryan Eade, Durham, NC (US); M. Scot Wingo, Durham, NC (US); Kevin Craig, Durham, NC (US); Edgar Lobaton, Durham, NC (US); Jeffrey Barahona, Durham, NC (US); Zach Fearnside, Durham, NC (US); Mark Welker, Durham, NC (US)

(*) Notice: Subject to any disclaimer, the term of this patent is extended or adjusted under 35 U.S.C. 154(b) by 0 days.

(21) Appl. No.: 17/534,623

(22) Filed: Nov. 24, 2021

(65) Prior Publication Data

US 2022/0164944 A1 May 26, 2022

Related U.S. Application Data (60) Provisional application No. 63/117,818, filed on Nov. 24, 2020.

(51) Int. Cl.
| | | |
|---|---|---|
| *G06T 7/00* | (2017.01) | |
| *G06F 3/14* | (2006.01) | |
| *G06T 7/40* | (2017.01) | |
| *G06T 11/60* | (2006.01) | |
| *H04N 23/56* | (2023.01) | |

(Continued)

(52) U.S. Cl.
CPC ............ *G06T 7/0004* (2013.01); *G06F 3/14* (2013.01); *G06T 7/40* (2013.01); *G06T 11/60* (2013.01); *H04N 23/56* (2023.01); *H04N 23/80* (2023.01); *G06F 1/1637* (2013.01); *G06T 2207/20081* (2013.01); *G06T 2207/30108* (2013.01)

(58) Field of Classification Search
CPC ......... G06T 7/0004; G06T 7/40; G06T 11/60; G06T 2207/20081; G06T 2207/30108; G06F 3/14; G06F 1/1637; G06F 3/147; H04N 5/2256; H04N 5/23229; H04N 5/23293; H04N 5/2354; H04N 5/247; H04N 5/332; H04N 5/2251; B60C 25/007; B60C 11/246; G01B 11/22; G01B 11/24; G01M 17/022; G01M 17/027; G09G 2380/10
See application file for complete search history.

(56) References Cited

U.S. PATENT DOCUMENTS

| 10,063,837 B2 * | 8/2018 | Zoken ................... H04N 13/221 |
| 2018/0222499 A1 * | 8/2018 | Gomes ................... G06V 20/52 |

(Continued)

*Primary Examiner* — Frank F Huang
(74) *Attorney, Agent, or Firm* — John L. Sotomayor (57) ABSTRACT

The tire sensing and analysis system may comprise a measurement device and local application software. The measurement device may make contact with a tire of a vehicle such that the measurement device is positioned at a specific distance and orientation relative to the tire. The measurement device may capture multiple images of the tire using an RGB camera and a pair of infrared cameras. The local application software may analyze the images and may construct a 3D mesh describing the 3-dimensional contours of the tread. The local application software may determine a tread depth and may display status and warning messages on a display unit that is coupled to the measurement device. The measurements may be communicated to remote application software for additional analysis. As non-limiting examples, the remote application software may detect specific tire wear patterns and may transmit a report to share results of the analysis.

14 Claims, 10 Drawing Sheets

(51) Int. Cl.
*H04N 23/80* (2023.01)
*G06F 1/16* (2006.01)

(56) References Cited

U.S. PATENT DOCUMENTS

| | | | |
|---|---|---|---|
| 2018/0237041 A1* | 8/2018 | Mesher | H04N 5/2254 |
| 2019/0113356 A1* | 4/2019 | Fowe | G01C 21/3407 |
| 2019/0285421 A1* | 9/2019 | Johnston | G01C 21/3881 |
| 2020/0031281 A1* | 1/2020 | Watanabe | G06T 1/00 |
| 2020/0072631 A1* | 3/2020 | Fowe | G08G 1/0112 |
| 2020/0073966 A1* | 3/2020 | Fowe | G08G 1/0112 |
| 2020/0158656 A1* | 5/2020 | Chung | B61L 23/048 |
| 2020/0186778 A1* | 6/2020 | Meyer | H04N 5/23299 |
| 2020/0292331 A1* | 9/2020 | Rabel | G06F 16/29 |
| 2020/0349743 A1* | 11/2020 | Kitamura | G06T 11/00 |
| 2021/0146974 A1* | 5/2021 | Wang | H04B 7/0695 |

\* cited by examiner

TIRE SENSING AND ANALYSIS SYSTEM

CROSS-REFERENCE TO RELATED APPLICATION

This application claims the benefit of priority to U.S. Provisional Application No. 63/117,818, filed Nov. 24, 2020, entitled "Tire Sensing and Analysis System" which is incorporated by reference herein in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The tire sensing and analysis system combines hardware and software to solve the problem of accurately, rapidly, and inexpensively measuring and analyzing tire treads for both depth and unusual wear patterns. Based upon the depth of the tread, the invention may suggest that the current tires are unsafe and it is time to purchase new tires. Based upon wear patterns, the invention may suggest specific maintenance actions, changes in driving habits, and/or selection of a different tire. As non-limiting examples, the invention may suggest increasing or decreasing tire pressure in one or more specific tires, gentler braking, or using all-terrain tires.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Goals of the tire sensing and analysis system invention include, but are not limited to, scanning all four tires in less than 3 minutes, operating while off-line which is defined as operating with no network connection, producing precise results with minimal operator training, compatibility with any vehicle having tires with 12 inch to 34 inch diameter, providing real-time feedback to the operator and portable/mobile operation. It is also a goal to provide connectivity such that measurement gathered in the field may be uploaded to a remote computer for storage, cataloging, and post processing when a network becomes available. The invention may comprise a measurement device and local application software. The measurement device may make contact with a tire of a vehicle such that the measurement device is positioned at a specific distance and orientation relative to the tire. The measurement device may capture images of the tire which the local application software may analyze to determine specific measurements and features of the surface of the tire, including tire tread, common features, and anomalous features that may require additional investigation. The measurement device may capture a 2D image of the surface of the tire using an RGB camera with special emphasis on the tread pattern and features of the tire. The measurement device may image the surface in infrared (IR) light using a right IR imager and a left IR imager. The local application software may construct a 3D mesh from the images obtained from the right IR imager and the left IR imager. The 3D mesh may describe the 3-dimensional contours of the tire surface including a tread and other features of the tire surface. The local application software may analyze the 2D image and the 3D mesh to determine a tread depth and measurements for other surface features of the tire. The tread depth and other surface features may be displayed on a flat-screen display of a display unit that is coupled to the measurement device. The measurement device may be quickly moved to other tires of a vehicle to analyze all tires of the vehicle.

The measurement device may comprise an electronics bay, a first distancing arm, a second distancing arm, the display unit, a trigger, a swivel joint, and a contoured grip. The measurement device may contact the tire, capture the images of the tire, and, using the local application software stored within the measurement device, analyze the images.

The electronics bay may comprise an embedded computer, the right IR imager, the left IR imager, one or more LEDs, the RGB camera, and a battery. The embedded computer may comprise a processor, a read-only memory, read/write memory, input/output ports, and one or more communication modules. The one or more communication modules may comprise both near field communication capability such as Bluetooth or BLE and wireless communication capability. The embedded computer may control the overall operation of the invention. As non-limiting examples, the embedded computer may initiate the acquisition of the images from the RGB camera, the left IR imager, and the right IR imager, may analyze the images and perform calculations to determine the tread depth, and may present the results of calculations on the flat-screen display. The processor may execute instructions of a stored program that determine the sequence and timing of the measurement device.

The read-only memory may comprise one or more memory devices that hold the stored program such that the stored program is retained when power is removed from the measurement device. As non-limiting examples, the read-only memory may be Read Only Memory (ROM), Programmable Read Only Memory (PROM), Erasable Programmable Read Only Memory (EPROM), Electrically Erasable Programmable Read Only Memory (EEPROM), Flash memory, or combinations thereof.

The read/write memory may comprise one or more memory devices that hold data and/or programs that may periodically change. As non-limiting examples, the read/write memory may be Random Access Memory (RAM), Static Random Access Memory (SRAM), Dynamic Random Access Memory (DRAM), Flash memory, or combinations thereof. As non-limiting examples, the read/write memory may be used to store the images of the tread and other surface features of a tire, intermediate and final results of calculations, vehicle identification information, operator identification information, or combinations thereof.

In some embodiments, the local application software may be stored within the read-only memory, within the read/write memory, or combinations thereof. In some embodiments, the local application software may be updated by newer versions of the local application software through a communication link with a system server whenever such a communication link is available.

The input/output ports may provide analog and/or digital signal lines that the processor may sense and/or control such that the processor may interact with the invention. As a non-limiting example, the input/output ports may provide the interface necessary for the processor to initiate the 2D image capture and to acquire the 2D image. In some embodiments, the input/output ports may comprise one or more USB ports that are accessible within the measurement device, accessible from outside of the measurement device, or both.

The one or more communication modules may provide one or more communication interfaces between the processor and devices located outside of the measurement device. In a non-limiting example, the one or more communication modules may comprise a WiFi interface such that the measurement device may wirelessly exchange data and commands with a remote data processor housed within a system server via a computer network. As a further non-limiting example, the one or more communication modules may comprise a near field communication protocol, such as a Bluetooth or BLE interface, such that the measurement device may wirelessly exchange data and commands with the remote system server via a local smartphone, a cellphone network, a computer network, or combinations thereof.

In some embodiments, the embedded computer may comprise a single-chip microprocessor that packages the processor, the read-only memory, the read/write memory, the input/output ports, the one or more communication modules, or combinations thereof into a single chip.

The right IR imager and the left IR imager may be cameras that are sensitive to light in the infrared (IR) portion of the light spectrum. As a non-limiting example, infrared light may be light having a wavelength of 700 nm to 1000 nm. In this non-limiting example, the one or more LEDs and 2 receivers, the right IR imager and the left IR imager, provide the data to build a 3-D model of the surface features of the tire under measurement. This combination of the one or more LEDs and a right IR imager and a left IR imager collects more than 500,000 datapoints about the surface of the tire being measured and analyzed. This collected information provides a very detailed dataset of all of the nuances of the surface features of the tire tread and provides the measurements to calculate depth information for the tire tread of the tire under measurement. This collected dataset also permits the rendering and generation of a 3D image of the tire under measurement. This collected dataset and the 3D image generated permits the analysis of the tire tread and tire surface to determine wear patterns and permits the determination of causes of the discovered wear patterns and tire surface features that may be anomalous.

The right IR imager and the left IR imager may be mounted within an electronics bay enclosure such that the right IR imager and the left IR imager are positioned along an imaginary horizontal line extending parallel to the axis of rotation of the tire and such that the right IR imager is to the right of the left IR imager. The right IR imager may be separated from the left IR imager by an IR imager separation distance which may be measured from the center of the right IR imager to the center of the left IR imager. The IR imager separation distance may be known by the local application software. The one or more LEDs positioned adjacent to the right IR imager and the left IR imager may provide a source of illumination for the right IR imager and the left IR imager. The one or more LEDs may be oriented to illuminate the tread that is being imaged.

Figure 9:
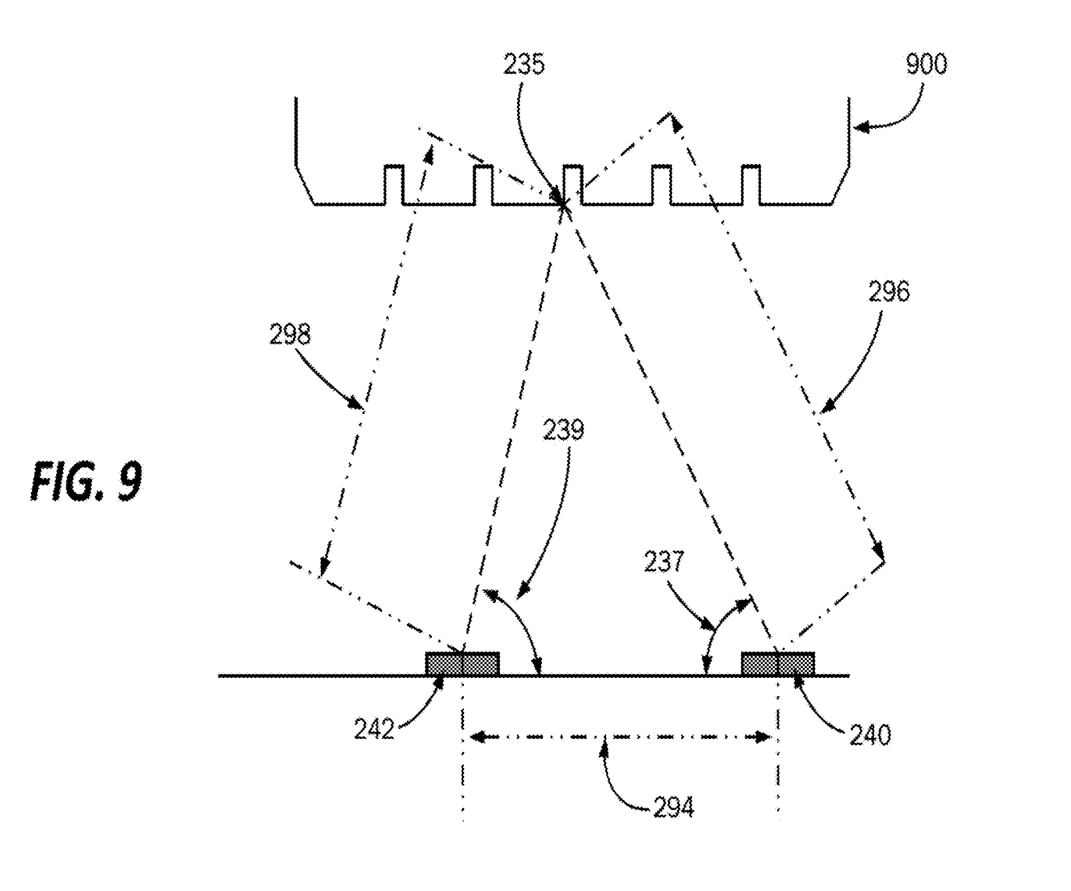
FIG. 9 is a detail view illustrating the determination of distances consistent with certain embodiments of the present invention.

FIG. 9 comprises a top view looking down at the right IR imager, the left IR imager, and a tire to be measured. Because the IR imager separation distance is known and the right IR imager and the left IR imager are oriented to point in parallel towards the tread of the tire being measured, the images captured by the right IR imager and the left IR imager constitute a stereoscopic pair which encode distance information. Specifically, the local application software may be operable to determine a first feature distance from the right IR imager to an identified common feature and may be operable to determine a second feature distance from the left IR imager to a common feature. The common feature is a point on the tread that is visible to both the right IR imager and the left IR imager and which can be uniquely identified in the images taken from both the right IR imager and the left IR imager.

As a non-limiting example, the local application software may be able to apply the geometric Angle-Side-Angle (ASA) postulate to determine the first feature distance and the second feature distance. ASA allows the unknown lengths of two sides of a triangle to be determined if the length of a side and two adjacent angles are known. In this case, the length of one side of the triangle is known to be the IR imager separation distance and the two adjacent angles, a right camera azimuth angle and a left camera azimuth angle, may be determined by the local application software. With these values known, the third angle may be determined by subtracting the right camera azimuth angle and the left camera azimuth angle from 180 degrees. The first feature distance and the second feature distance may be determined by applying the law of sines, per ASA.

The local application software may be operable to determine the right camera azimuth angle based upon the position of the common feature in a right IR image. The local application software may be operable to determine the left camera azimuth angle from the left IR imager to the common feature based upon the horizontal position of the common feature in a left IR image.

The following non-limiting example demonstrates one method that the local application software may determine the right camera azimuth angle from the right IR image. The left camera azimuth angle may be determined from the left IR image in an equivalent manner.

Figure 10:
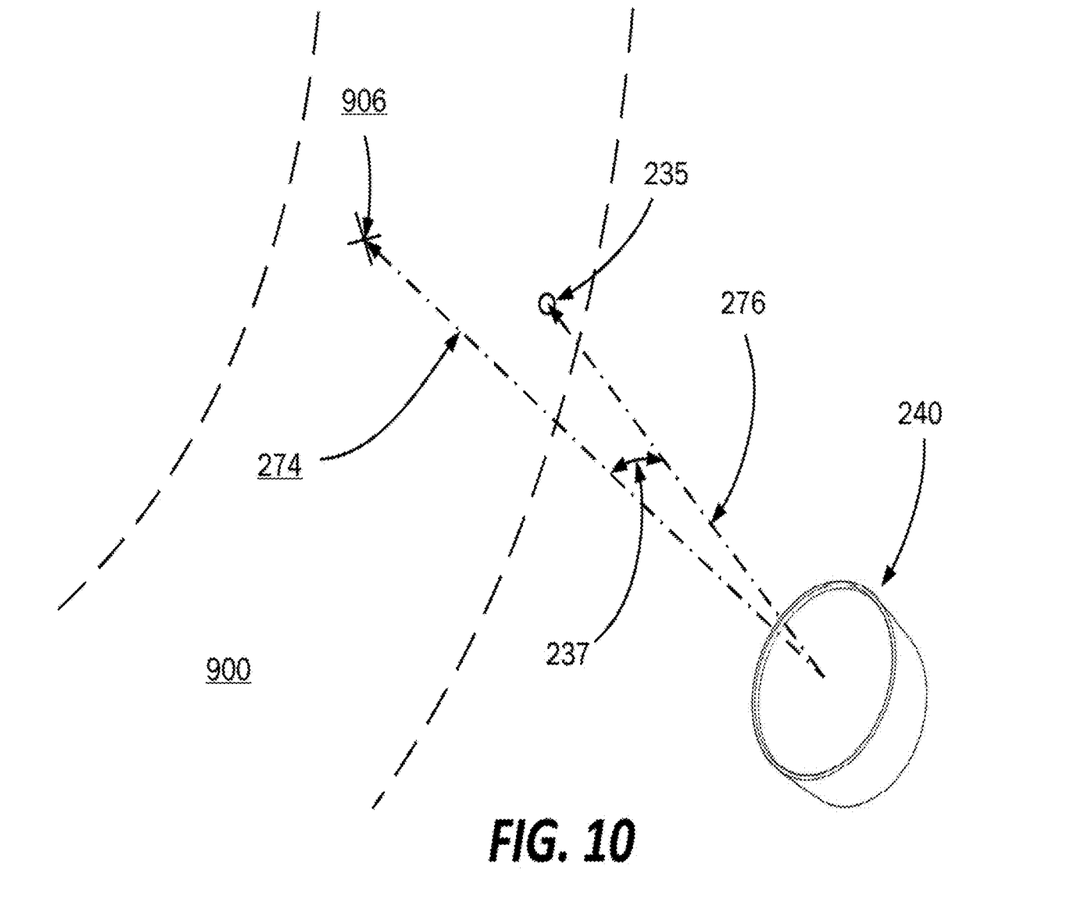
FIG. 10 is a detail view illustrating an azimuth angle between a ray drawn from an imager to a common feature of the surface of a tire and a ray drawn from the imager to an anomalous feature of the surface of the tire consistent with certain embodiments of the present invention.
Figure 11:
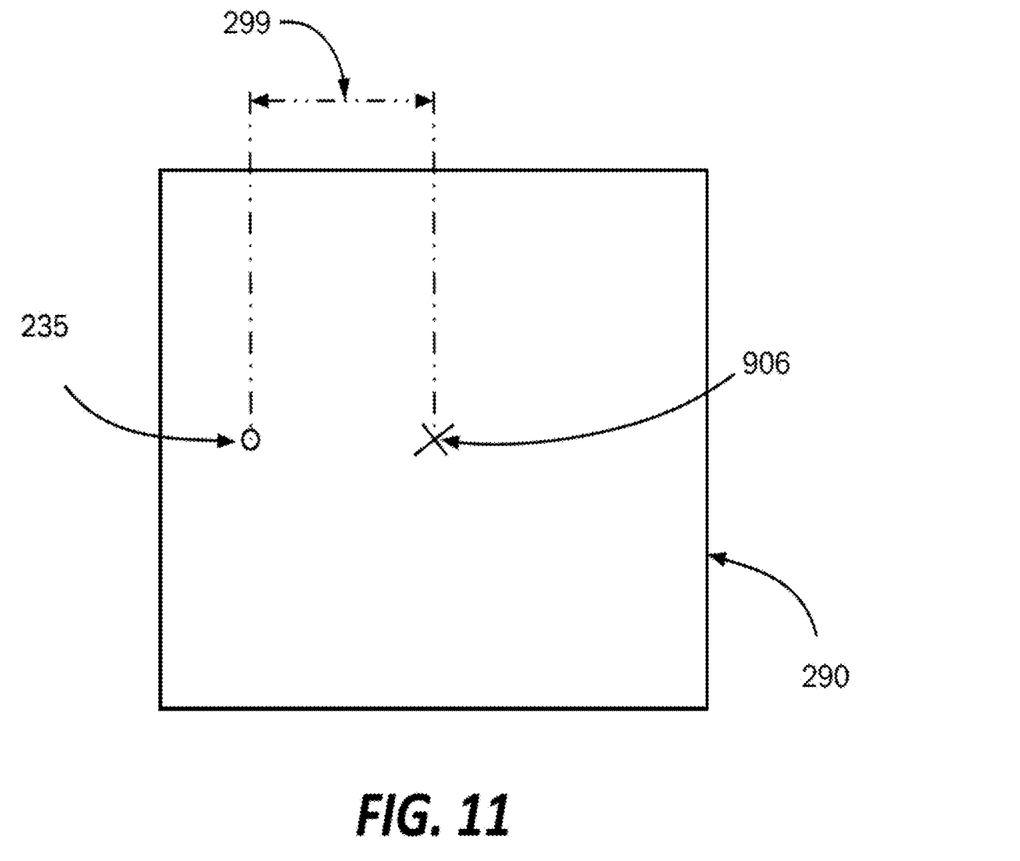
FIG. 11 is a detail view illustrating determination of a separation distance from a captured image consistent with certain embodiments of the present invention.

As shown in FIG. 10 and FIG. 11, a spot on the tire, potentially an anomalous feature, that is directly in front of the right IR imager is represented as an 'X' and the common feature is represented as 'O'. The right camera azimuth angle may be the angle formed by two imaginary rays projected away from the right IR imager towards the tire. A first ray may be perpendicular to center of the right IR imager. A second ray may project from the center of the right IR imager to the common feature. If the common feature is directly in front of the right IR imager, then the 'X' and the 'O' coincide at the center of the right IR image and the right camera azimuth angle is determined to be 0 degrees. However, if the common feature is to the left of the right IR imager as shown in FIG. 10, then the common feature will appear in the right IR image to the left of center as shown in FIG. 11. The farther to the left the common feature appears in the right IR image, the greater the right camera azimuth angle is. Because the right IR imager is held in a known geometry with respect to the tire by the first distancing arm and the second distancing arm, the local application software may estimate the right camera azimuth angle from a pixel separation distance between the center of the right IR image and the position of the common feature in the right IR image. If the common feature appears to the right of center in the right IR image, then the right camera azimuth angle may be computed to be a negative angle. An analogous analysis of the left IR image may determine the left camera azimuth angle.

In some embodiments, the local application software may use the same technique to determine elevation angles for the common features. The elevation angles may be measured up and down from the right IR imager. In other words, the elevation angles may be measured perpendicular to the azimuth angles.

With the first feature distance and the second feature distance known for the common feature, the local application software may determine a position of the common feature in a three-dimensional coordinate system.

The local application software may determine the first feature distance and the second feature distance for a plurality of the common features dispersed across the tread and may construct the 3D mesh describing the contour of the tread. As a non-limiting example, the 3D mesh may be a data structure that stores a 3D model of the common features. As non-limiting examples, the 3D mesh may be analyzed by the local application software to determine the tread depth, to identify wear patterns, or to identify damage or defects.

The one or more LEDs may comprise individually addressable RGB LEDs, white LEDs, IR LEDs, or any combination thereof. In some embodiments, the brightness of the one or more LEDs may be under control of the local application software. The individual addressability of the one or more LEDs combined with the ability to control the brightness of the one or more LEDs may enable the local application software to illuminate the surface of the tire using a color and intensity of illumination selected by the local application software to best show details of interest.

The RGB camera may be operable to capture the 2D image of the tread in the visible light spectrum. In some embodiments, the local application software may use the 2D image to identify the common features that may form the frame for building the 3D mesh. In some embodiments, the local application software may use the 2D image as the base for overlaying with graphics, textual messages, or combinations thereof before presenting results to an operator. As a non-limiting example, the local application software may graphically highlight a region of the tread found to be the shallowest along with one or more textual messages conveying the actual tread depth.

The battery may comprise one or more energy-storage devices. The battery may be a source of electrical energy to operate the electronics bay and the display unit. The battery may be replaceable or rechargeable. The electronics bay may further comprise a charging port for recharging the battery. In some embodiments, the charging port may be covered by a weatherproof port cover when not in use. The electronics bay may comprise a power switch that may be operable to energize and deenergize the invention. The power switch and the charging port may be accessible on an electronics bay lid.

The embedded computer, the right IR imager, the left IR imager, and the RGB camera may be packaged on one or more circuit boards housed within the electronics bay enclosure. One or more windows on the front of the electronics bay enclosure may provide a visual pathway between the tire and the right IR imager, the left IR imager, the one or more LEDs, or any combination thereof. The one or more windows may be transparent to IR and visible light.

The first distancing arm and the second distancing arm may be standoffs that position and orient the electronics bay with respect to the tire. The first distancing arm and the second distancing arm may determine the distance between the tire and the electronics bay. As previously described, the first distancing arm and the second distancing arm may determine the orientation angle of the electronics bay.

An individual distancing arm selected from the first distancing arm and the second distancing arm may comprise a tire guard and a spacing arm. The tire guard may be an armature that may press against the tire when the invention is in use. The tire guard may be oriented to be parallel to the electronics bay. The spacing arm may be an armature that positions the tire guard at a pre-determined, fixed distance from the electronics bay. A proximal end of the spacing arm may couple to the electronics bay and a distal end of the spacing arm may couple to the tire guard.

The angle between the first distancing arm and the second distancing arm may be established by the coupling of the first distancing arm and the second distancing arm to the electronics bay. This coupling may also establish the orientation angle of the electronics bay with respect to the first distancing arm and the second distancing arm. In a preferred embodiment, the angle between the first distancing arm and the second distancing arm may be 60 degrees+/−1 degree. The electronics bay may be oriented to split the angle between the first distancing arm and the second distancing arm in half such that the right IR imager and the left IR imager may each point at a 30 degree+/−1 degree angle midway between the first distancing arm and the second distancing arm when viewed from the side.

The display unit may house the flat-screen display. The flat-screen display may be electrically coupled to the embedded computer and may be operable to report operational status of the electronics bay in the form of a system status report as determined by the stored program in the embedded computer and/or results of computations performed by the local application software. As non-limiting examples, the flat-screen display may be a color or monochrome display based upon Liquid Crystal Display (LCD), Light Emitting Diode (LED), Organic LED (OLED), or Organic LCD (OLCD) technologies. The flat-screen display may present graphical information, textual information, or both. As non-limiting examples, the flat-screen display may report the operational status of a low battery condition or the display may present to the user the tread depth of the tire.

In some embodiments, the local application software may be configured to report various conditions of the tire based upon an analysis of the surface of the tire. One such condition, in a non-limiting example, may be an unsafe operational condition of the tread or be based upon discovered surface conditions that may cause unsafe operation of the tire if not corrected. If the local application software determines that an unsafe condition exists for one or more of the tires, a "red zone" warning may be presented on the flat-screen display. A "red zone" warning may be pre-configured for numerous tread and/or surface features that may indicate the unsafe operation of a tire. In a non-limiting example, an unsafe condition that may result in a "red zone" warning may include determination that the tread depth of one or more of the tires is below a minimum safe depth.

The trigger may be electrically coupled to the embedded computer and may be operable to initiate an operation when activated by the operator. In a non-limiting example, the trigger may initiate the capture of data points that permit the creation of 2D and 3D models of the surface of one or more tires. The collected data points provide for the creation of images of the tire surface and permit an analysis of the tread depth and surface features of the tire being imaged when one or more analytic algorithms are utilized by the local measurement application to create one or more results display images. The display images created by the local measurement application may be displayed as results on the flat-screen display visible to the user when activated by the user.

The swivel joint may be a mechanical hinge that is operable to change the viewing angle of the flat-screen display. In some embodiments, the swivel joint may permit the viewing angle of the flat-screen display to be changed when pressure is applied and may hold the viewing angle of the flat-screen display when pressure is released. As a non-limiting example, the swivel joint may comprise a friction fit between movable elements which may be overcome by the application of pressure.

The contoured grip may be a shaped grip adapted to be held by the operator while operating the invention.

In some embodiments, the invention may be packaged as a stand-up device. A stand-up device as used herein is a device that may be used to perform the data collection of surface features of a tire while the operator or user stands upright utilizing an extended handle and activating the device using the trigger attached to the extended handle. The stand-up device may be intended for use with a vehicle that is on the ground. The first distancing arm of the stand-up device may rest on the ground with the second distancing arm suspended above the first distancing arm at a known distance and angle from the first distancing arm. The stand-up device may be used by sliding the first distancing arm and the second distancing arm to bring each of the distancing arms into contact with the surface of the tire such that the first distancing arm touches the tire and the ground and the second distancing arm touches the tire only. The stand-up device may fit between the tire and a wheel well of the vehicle when in position to perform a data collection action. The stand-up device may collect data from the rear-facing tire surface or from the front-facing tire surface and may be moved into position at the front or the rear of the tire to support these data collection operations.

The stand-up device may comprise an extended handle that elevates the display unit and the trigger that are positioned at the upper end of the extended handle. A lower end of the extended handle may couple to the swivel joint located on a side of the electronics bay. The upper end of the extended handle may couple to the contoured grip. The bottom surface of the display unit may be coupled to the upper end of the extended handle. In addition, the trigger may be coupled to the contoured grip.

The swivel joint on the stand-up device may pivot forward and rearward to present the flat-screen display to the operator. In a preferred embodiment, the swivel joint may pivot through 120 degrees+/−10 degrees so that the invention may be positioned to scan the tire from the front-facing surface of the tire or from the rear-facing surface of the tire.

In some embodiments, the invention may be packaged as a hand-held device. The hand-held device may be intended for use with the vehicle that is raised off of the ground by a lift.

The contoured grip of the hand-held device may be coupled to the bottom of the electronics bay such that the hand-held device is adapted to be held in the air by the operator with the first distancing arm and the second distancing arm in physical contact with the surface of the tire of the vehicle. The trigger of the hand-held device may be coupled to the contoured grip such that the operator may initiate an action while holding the hand-held device. The display unit may be coupled to the contoured grip facing the operator via the swivel joint. The swivel joint may be operable to tilt the display unit up and down to present the flat-screen display to the operator.

In some embodiments, the local application software may be packaged with the stored program of the embedded computer which handles initializing, self-testing, and I/O operations of the electronics bay and the display unit. In an embodiment, the local application software may be operative to collect data points from the 2D image and the 3D mesh and to store the data points in an electronic data storage element in the hand-held or stand-up device.

In an embodiment, the local application software may monitor the trigger of the device as an activation element to determine when the operator wishes to initiate an action. When the user selects activation by pressing the trigger, the local application software energizes the one or more LEDs and acquires the images from the right IR imager, the left IR imager, and the RGB camera as data points to be stored in the local electronic storage element of the device. The local application software may utilize one or more embedded algorithms to analyze the images to detect the common features, determine positions of the common features in three dimensions, and define the 3D mesh representing the tread on the tire. The local application software may determine the tread depth and other surface features, including the common feature, and may report the tread depth and associated warnings, alerts, and information.

The local application software may take the 2D image and 3D mesh and may use the 2D image to first align the images perfectly to get a representative view of a perpendicular slice of the exterior surface of a tire. The 3D data may be down-sampled and may be used to identify the treads of the tire and any additional surface features across the perpendicular slice of the surface of the tire. Subsequent to the identification of the tread portions of the tire surface, the local application software may go to the full-resolution detailed data to determine the tread depth using the non-tread area compared to the tread areas. The local application software may then resolve further to a millimeter calculation of absolute and comparative tread depth.

The local application software may establish a communications link to remote application software residing on a remote computer by utilizing the WiFi interface and/or a Bluetooth interface if and when they become available and a connection is established. The local application software may transmit data regarding the tires that the invention has scanned since the last communication session. As non-limiting examples, the data transmitted to the remote application software may comprise identification information for the vehicle and the operator, the date, time, and location of the scans, the images captured, the 3D mesh that was created, the results of analysis performed by the local application software, or any combination of this information. In some embodiments, the remote application software may be cloud-based.

In some embodiments, the local application software may receive software updates from the remote application software. Upon receipt of the updated information from the local application software, the remote application software may catalog and store the received information so that the remote application software may build a history associated with the vehicle. During further processing, if requested by a user or in accordance with established procedure, the remote application software may further analyze the received data. As a non-limiting example, the remote application software may analyze the images to determine whether tread wear patterns are present and, if so, the remote application software may determine whether the tread wear patterns are suggestive of issues other than typical wear and tear on the surface of the tire(s). The additional analysis may detect characteristic wear patterns indicative of poor driving habits, vehicle maintenance issues, defective tires, or other situations. The remote application software may look at a wider slice of the tire and use machine learning to train the system to identify common problematic tread wear patterns that can indicate tire and suspension problems.

In a non-limiting example, the following is a non-exhaustive list of some of the common problems that humans identify with tire tread that may be discovered and identified by the system:

Toe wear or feathered edges—Improper toe alignment
Camber wear—Improper camber alignment
Center wear—Tire over inflated
Edge wear (inside or outside)—Tire under inflated
Patch wear—Tire out of balance
Cup Wear—Bent or worn out suspension component
Brake skid damage—Check brakes, driving behavior
Chunking—vehicle driving on rough surfaces—Change tire type
Stone retention/drilling—Vehicle tread too large for conditions
Spin damage—Excessive vehicle acceleration, rotate tires more frequently
Heel wear—Maintenance problem, not rotating tires frequently enough Upon discovery each of these common problems may be identified and communicated to the technician performing the tire scan.

The machine learning system works by training the system on these common problematic wear patterns so that the system can identify them easily from the data captured by the tire scans. In many cases, the invention may be able to detect the earliest signs of problematic tire wear—at a point even before the human eye could detect the wear—while it is not too late to take corrective action.

As a non-limiting example, the remote application software may determine a trend line for the tread depth of each of the tires over time and may be able to predict remaining tire life based upon the history of the tread depth and possibly based upon the make and model of the tire being scanned. Because the vehicle may be serviced 2 to 6 times per year, a courtesy scan of the tires may be performed using the invention at each service event. Once two or more tread depth datapoints are available, predictive analytics may be able to establish the trend line. All tires are sold with a Uniform Quality Grade Standard (UTQG) as set by the DOT and NHTSA and indicate how many miles a tire will last. Using predictive analytics, the remote application software may alert the consumer if their tread wear, based on the multiple scans and, possibly, on the make and model of the tire, is trending at/below/above this threshold.

Additionally, in coordination with human analysts, the machine learning algorithm may identify tread wear patterns and other surface features that are less common but may be indicative of unusual or non-common problems that may need to be addressed. In a non-limiting example, the machine learning algorithm may identify a surface feature or wear pattern that does not match any pre-configured pattern or issue available to the machine learning algorithm. The system may flag these images and transmit the information to a human analyst. Upon receipt, the human analyst may input a definition of the cause of the surface feature or wear pattern identified, if known, or may flag the particular image file with a tag indicating that image requires further study. In this manner, such surface features or wear patterns that may indicate a non-common mechanical or use issue may be identified and included in future image analysis.

The remote application software may make recommendations for future purchases of tires based upon actual measured wear, deduced driving habits, and other results from the scans.

In some embodiments, the remote application software may create a report that is specific to the vehicle. The report may comprise the make and model of the tire scanned, the history of the dates when scans of the tires were made, the tread depth of each of the tires on those dates, the results of a predictive tread wear analysis, results of the tread wear patterns analysis, the identification of unexpected or unusual surface features, or any combination thereof. The report may be provided to the owner of the vehicle in the form of printed mail, email, text messaging, or any combination.

While the above description has suggested that some software functions are performed locally by the local application software and some software functions are performed remotely by the remote application software, those skilled in the art will recognize that certain software functions may be performed by either the local application software or the remote application software and that the decision to implement the software functions within the local application software or within the remote application software may include factors such as processor speeds, available memory, communication reliability and transfer speeds, and even marketing considerations.

Figure 1:
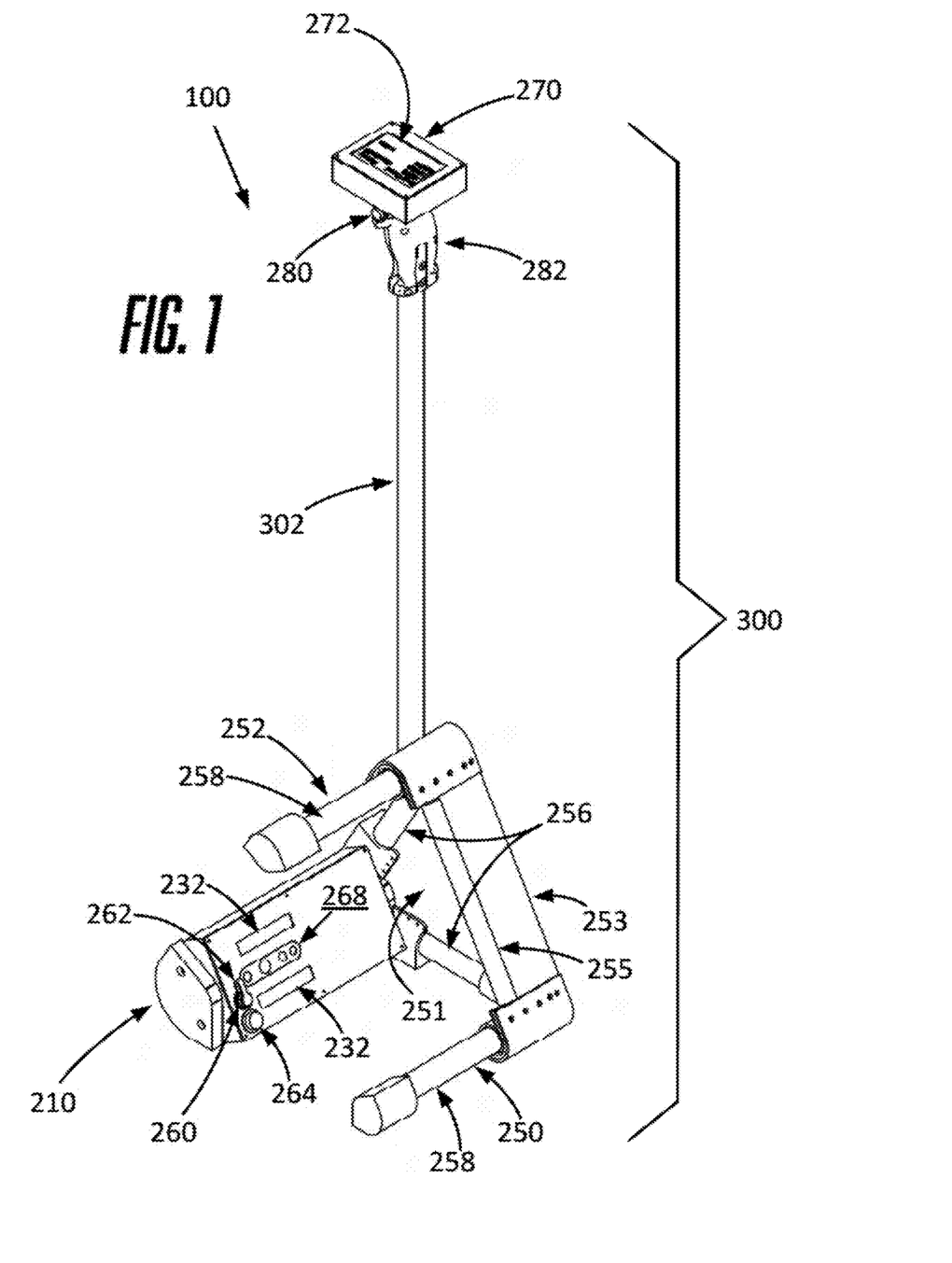
FIG. 1 is an isometric view of the stand-up device consistent with certain embodiments of the present invention.

Turning now to FIG. 1, this figure illustrates an isometric view of a stand-up device 300. The invention 100 may capture images of a tire which local application software may analyze to determine specific measurements and features of the surface of the tire, including tire tread, common features, and anomalous features that may require additional investigation. An electronics bay 210 may be centrally located with a first distancing arm 250 extending forward along the ground, a second distancing arm 252 extending forward and upwards, and an extended handle 302 extending up to a display unit 270. The display unit 270 may comprise a flat-screen display 272 for reporting status, the results of tire tread analysis, and other information. A trigger 280 located on the front of a contoured grip 282 may be used to initiate operations. Spacing arms 256 may retain tire guards 258 at a predetermined orientation and distance. The electronics bay 210 may comprise a camera assembly 268, one or more windows 232 covering illumination sources, a power switch 264, a charging port 260, and a weatherproof port cover 262 over the charging port 260. A side shade panel 251, a front shade panel 253, and a soft light barrier 255 may reduce interference from ambient light sources.

Figure 2:
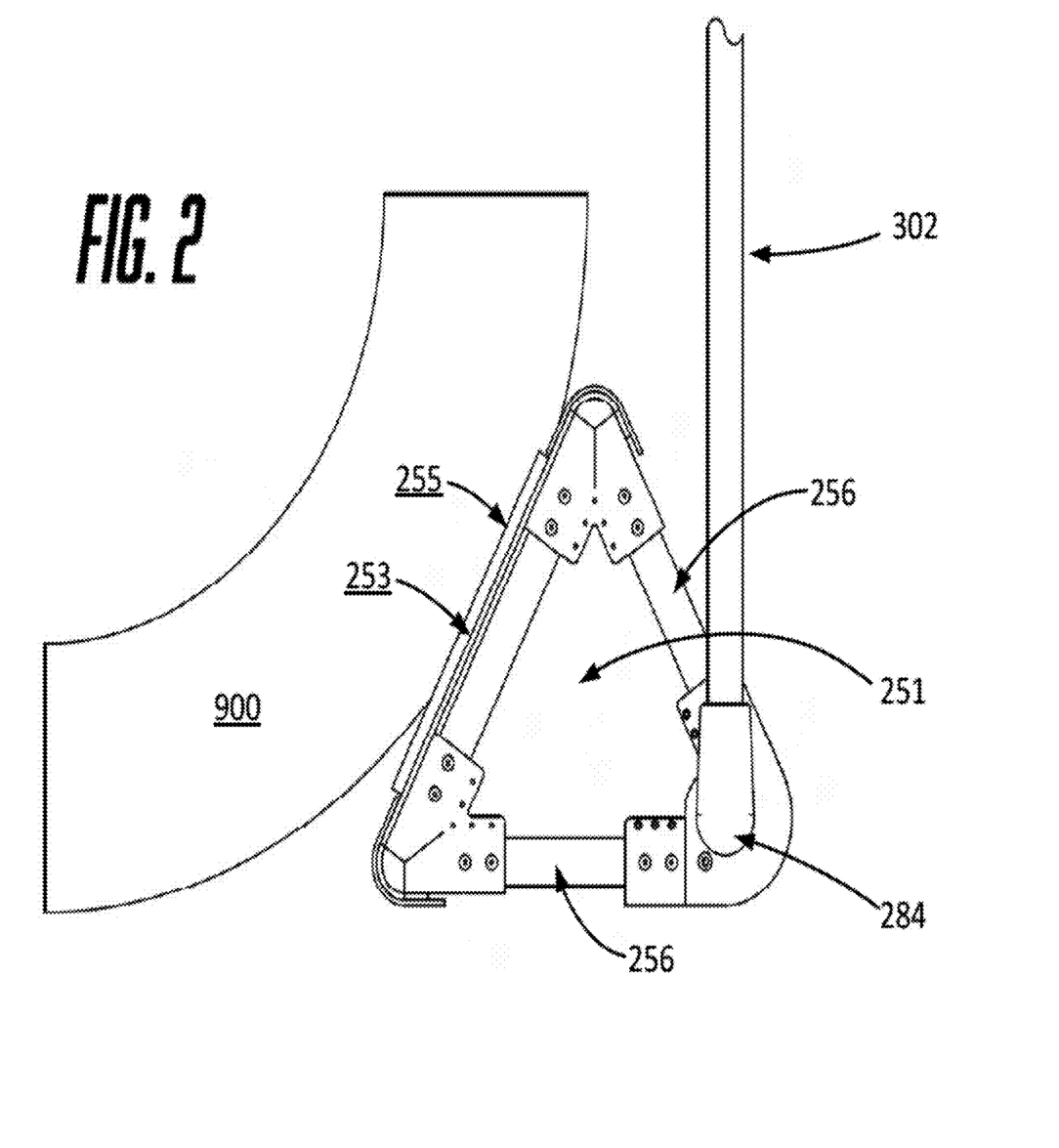
FIG. 2 is a side detail view of the stand-up device consistent with certain embodiments of the present invention.

Turning now to FIG. 2, this figure illustrates a side view of the stand-up device positioned to image and analyze a tire 900. Spacing arms 256 position the distancing arms against the tire 900 so that the analysis can factor in the predetermined orientation and distance to the tire 900 from the electronics bay. An extended handle 302, which leads up to a display unit at the top of the extended handle 302, may pivot at a swivel joint 284 to change the viewing angle of the display if desired. A side shade panel 251, a front shade panel 253, and a soft light barrier 255 may reduce interference from ambient light sources.

Figure 3:
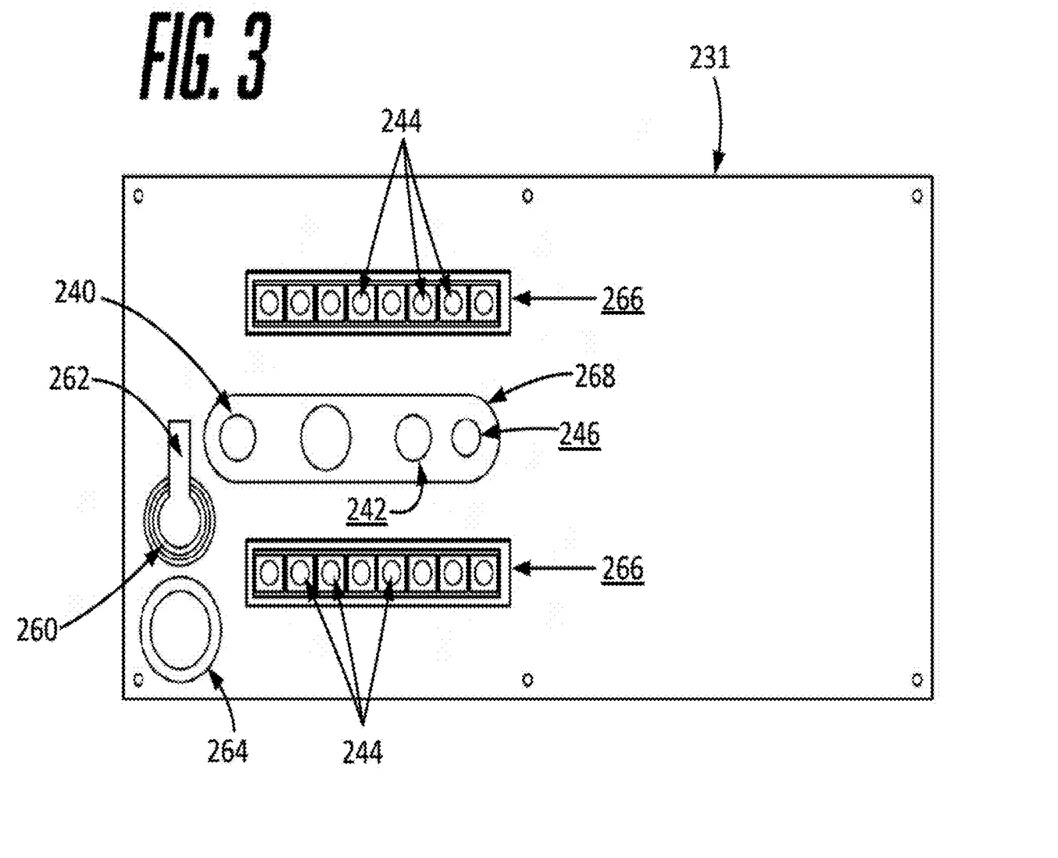
FIG. 3 is a detail view of the electronics bay lid consistent with certain embodiments of the present invention.

Turning now to FIG. 3, this figure illustrates an electronics bay lid 231. LED assemblies 266 comprising one or more LEDs 244 may be positioned above and below a camera assembly 268. The camera assembly 268 may comprise a right IR imager 240, a left IR imager 242, and an RGB camera 246 which may capture images which are analyzed by local application software. A power switch 264 may be accessible on the electronics bay lid 231, along with a charging port 260 that may be covered by a weatherproof port cover 262 when not in use.

Figure 4:
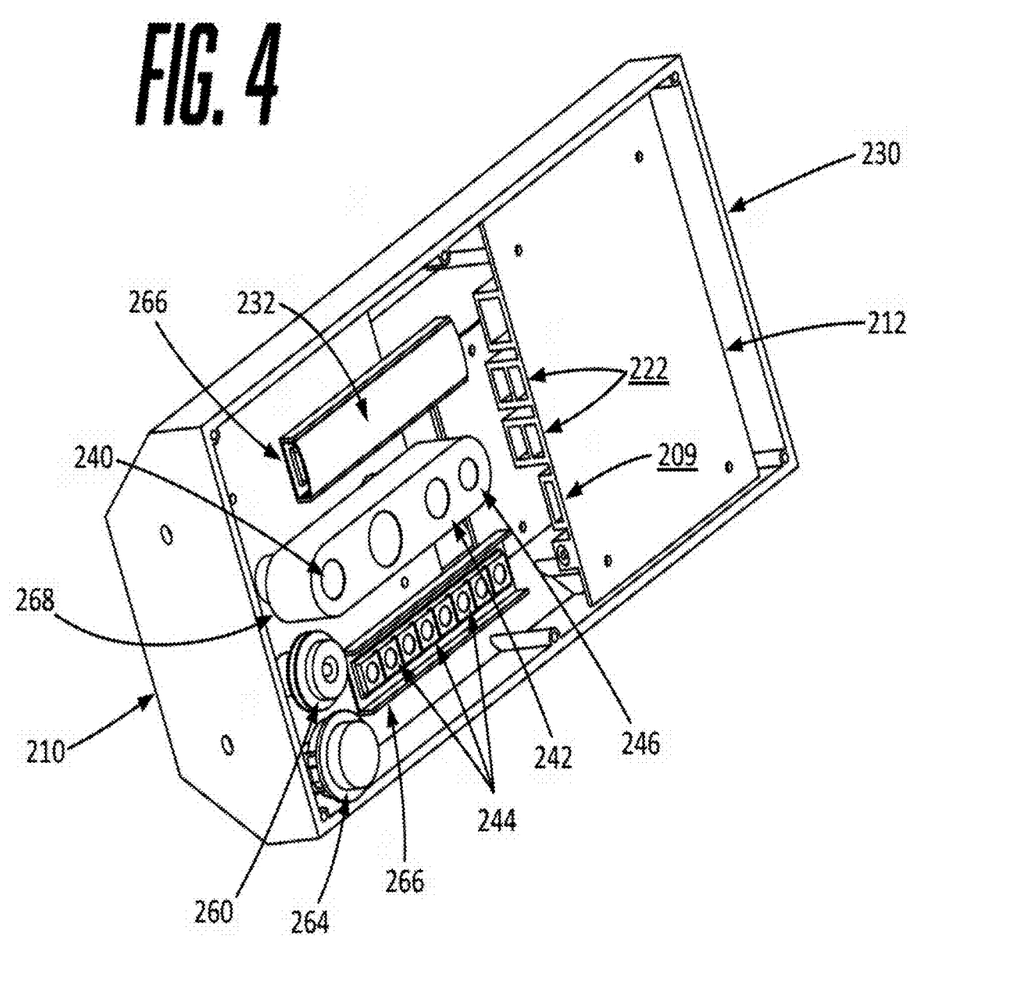
FIG. 4 is a detail view of the enclosure bay with the electronics bay lid removed consistent with certain embodiments of the present invention.

Turning now to FIG. 4, this figure illustrates an isometric view of an electronics bay 210 with the electronics bay lid removed. An electronics bay enclosure 230 may house an embedded computer 212, a camera assembly 268, a power switch 264, LED assemblies 266, and a charging port 260. The embedded computer 212 may comprise one or more USB ports 222 to electrically coupling to devices and a display I/O port 209 for communicating with the display unit. The camera assembly 268 may comprise a right IR imager 240, a left IR imager 242, and an RGB camera 246 for capturing images of the tire. The LED assemblies 266 may provide illumination for imaging. In FIG. 4, the upper LED assembly is shown with a window 232 in place and the lower LED assembly is shown with one or more LEDs 244 uncovered.

Figure 5:
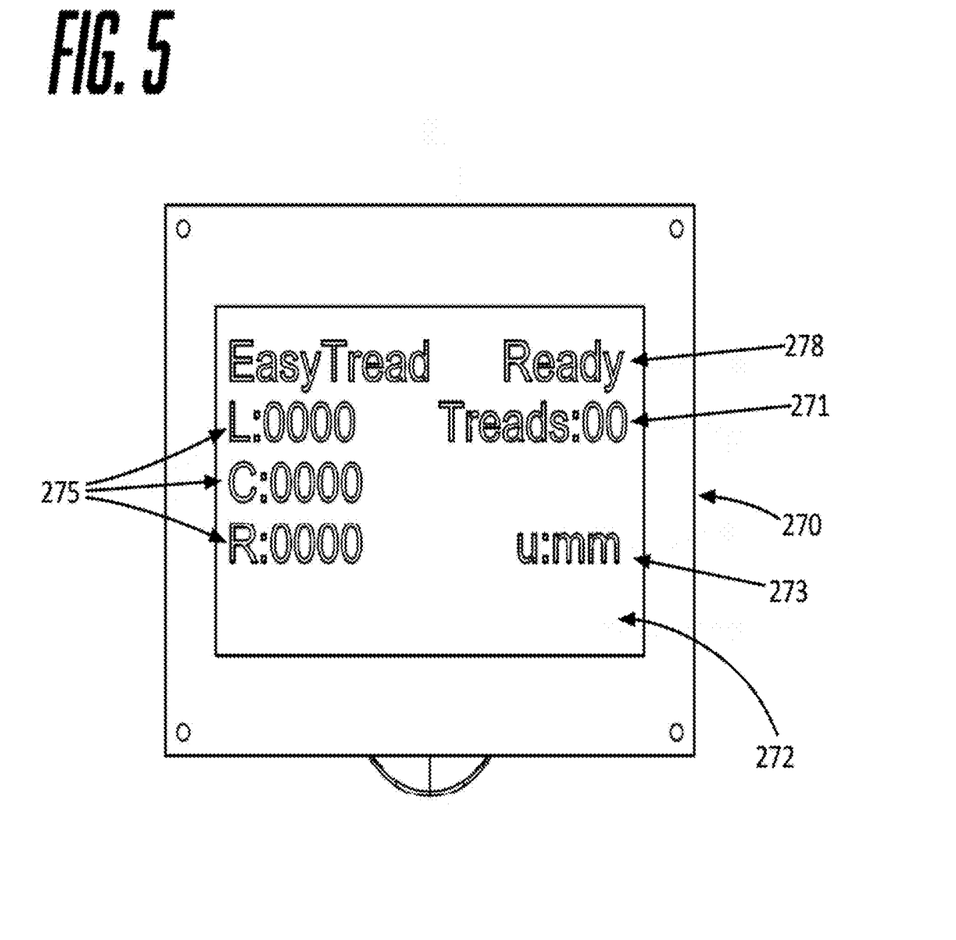
FIG. 5 is a detail view of the top of the display unit consistent with certain embodiments of the present invention.

Turning now to FIG. 5, this figure illustrates the top of a display unit 270. A flat-screen display 272 may present visual results to the operator. As a non-limiting example, the flat-screen display 272 may present calculated tread depths 275, a system status report 278, results of a tire scan 271, and a measurement unit 273.

Figure 6:
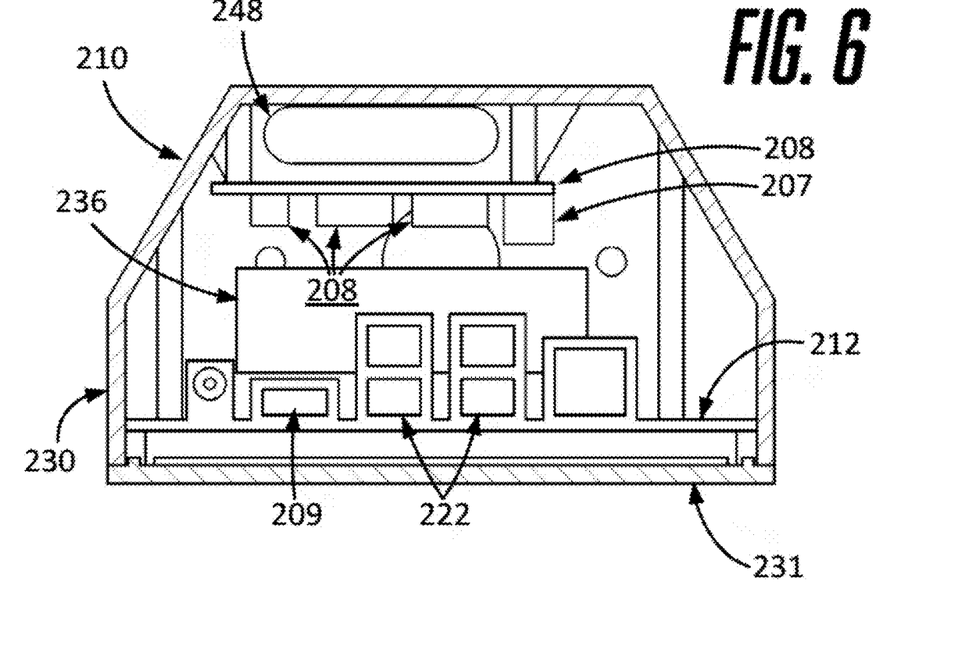
FIG. 6 is a cross-sectional view of the equipment bay looking towards the embedded computer consistent with certain embodiments of the present invention.

Turning now to FIG. 6, this figure illustrates a cross-sectional view of an electronics bay 210 looking towards an embedded computer 212. The embedded computer 212 may be housed between an electronics bay enclosure 230 and an electronics bay lid 231. The embedded computer 212 may execute local application software to capture images, analyze the images, report the results of the analysis, and communicate with a remote server. The embedded computer 212 may comprise a processor and heatsink 236, one or more USB ports 222 to electrically coupling to devices and a display I/O port 209 for communicating with the display unit. A power and peripheral management board 288 may comprise GPIO breakout connectors 208 for electrically coupling to subsystems within the electronics bay 210 and a piezoelectric sound transducer 207 for sounding audible alarms. A battery 248 may be a source of electrical energy to operate the electronics bay 210 and the display unit.

Figure 7:
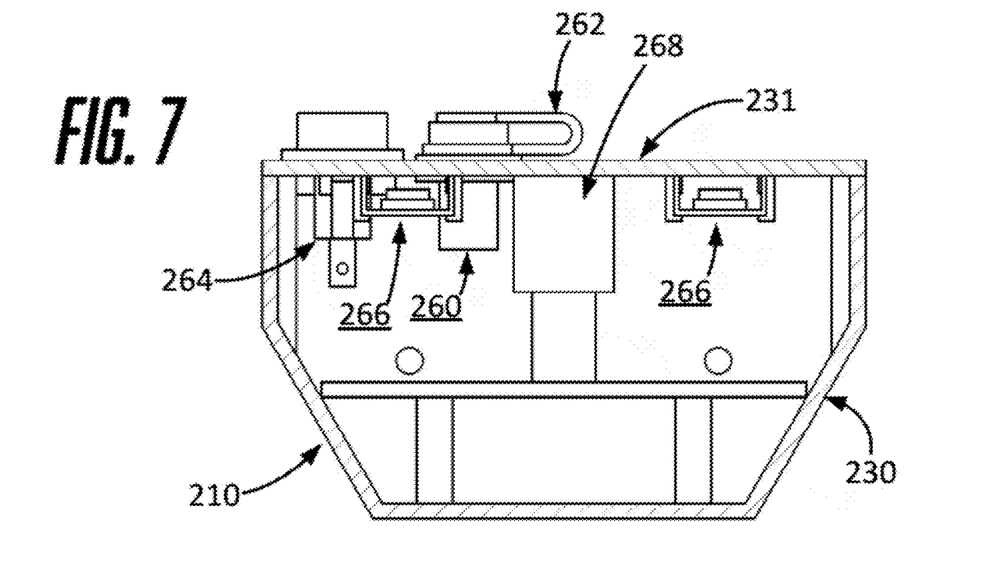
FIG. 7 is a cross-sectional view of the equipment bay looking towards the power switch consistent with certain embodiments of the present invention.

Turning now to FIG. 7, this figure illustrates a cross-sectional view of an electronics bay 210 looking towards a power switch 264. The power switch 264, a camera assembly 268, LED assemblies 266, and a charging port 260 may be housed between an electronics bay enclosure 230 and an electronics bay lid 231. The LED assemblies 266 may provide illumination during imaging. The camera assembly 268 may be operable to image the tire under the control of local application software. A weatherproof port cover 262 may cover the charging port 260 to protect the charging port 260 from exposure to rain, snow, dew, splashes, and other sources of moisture.

Figure 8:
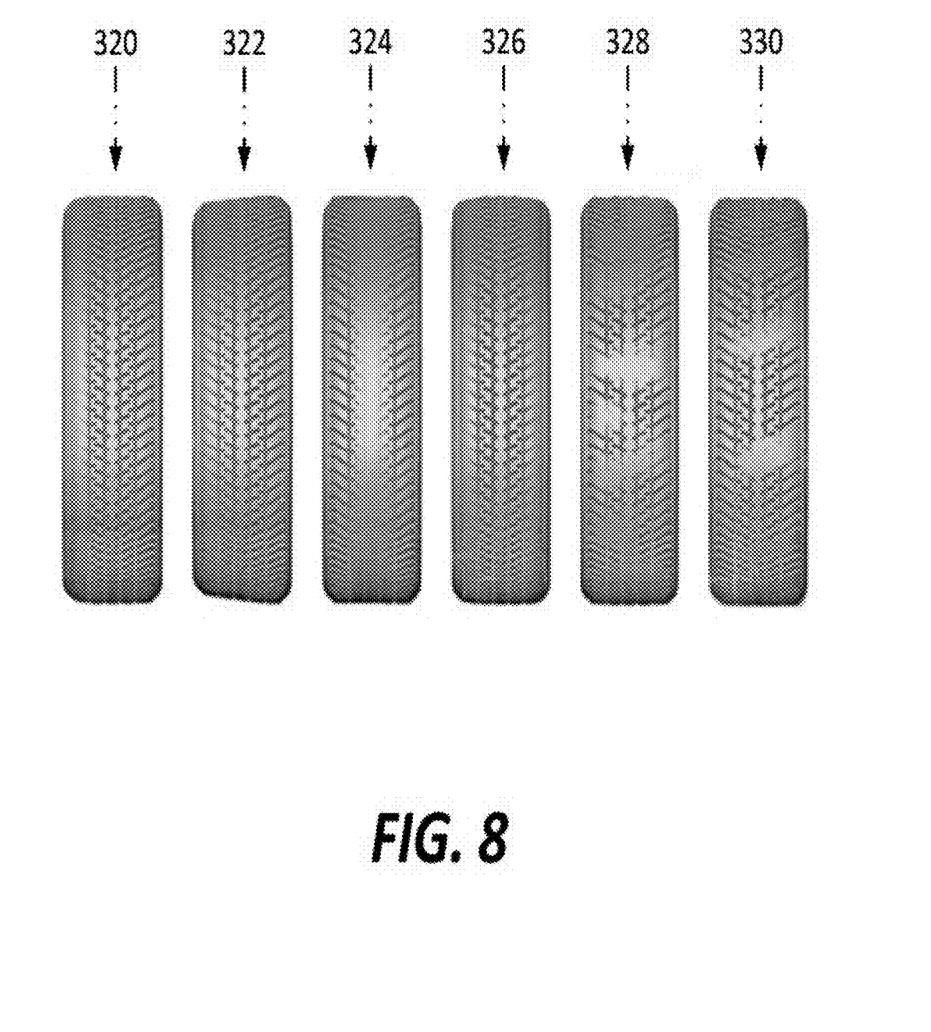
FIG. 8 is an illustration of six tire wear patterns consistent with certain embodiments of the present invention.

Turning now to FIG. 8, this figure illustrates non-limiting examples of tires exhibiting different and distinct wear patterns. Analysis of the tire surface imagery may identify a specific wear pattern and may suggest a cause of the wear pattern. As non-limiting examples, toe wear 320 and camber wear 322 make indicate alignment problems, center wear 324 may indicate over inflation, edge wear 326 may indicate under inflation, patch wear 328 may indicate that the tire is out of balance, and cup wear 330 may indicate suspension issues.

Turning now to FIG. 9, this figure illustrates how a first feature distance 296 and a second feature distance 298 may be determined. An IR imager separation distance 294 between a right IR imager 240 and a left IR imager 242 is known due to the design of the electronics bay. A right camera azimuth angle 237 and a left camera azimuth angle 239 may be deduced from the position of a common feature 235 of a tire 900 on images captured by the right IR imager 240 and the left IR imager 242. With the length of a triangle's side, the IR imager separation distance 294, and the measure of two adjacent angles, the right camera azimuth angle 237 and the left camera azimuth angle 239, known, the lengths of the other sides, which are the first feature distance 296 and the second feature distance 298, may be calculated by applying Angle-Side-Angle.

Turning now to FIG. 10, this figure illustrates that a right camera azimuth angle 237 between a common feature 235 on the surface of a tire 900 and an anomalous feature 906 on the surface of the tire 900 is measured as the angle between a first ray 274 running from a right IR imager 240 to the anomalous feature 906 and a second ray 276 running from the right IR imager 240 to the common feature 235. The right camera azimuth angle 237 corresponds to a pixel separation between the common feature 235 and the anomalous feature 906 on images captured by the right IR imager 240. A left camera azimuth angle may similarly be calculated from images captured by the left IR imager.

Turning now to FIG. 11, this figure illustrates a non-limiting example of a right IR image 290 captured by the right IR imager in FIG. 10 and shows a pixel separation distance 299 between a common feature 235 and an anomalous feature 906. The pixel separation distance 299 measured in pixels may correspond to the actual distance between the common feature 235 and the anomalous feature 906. Using this technique, the positions of a plurality of features on the surface of the tire may be determined. Combined with similar positioning obtained using the left IR imager, local application software may estimate the location of each feature in 3-dimensional space.

While certain illustrative embodiments have been described, it is evident that many alternatives, modifications, permutations and variations will become apparent to those skilled in the art in light of the foregoing description.

We claim:

1. A device for data collection and analysis of a vehicle tire, comprising:
    a first distancing arm and a second distancing arm where said first distancing arm extends along a ground-level surface and second distancing arm positioned vertically above said first distancing arm;
    a shade panel oriented vertically and connected at a bottom end to said first distancing arm and at a top end to said second distancing arm;
    an extended handle extending vertically from said shade panel;
    a trigger and electronic control and electronic display unit connected to the top portion of said extended handle;
    a first spacing arm and a second spacing arm physically connected to said shade panel and said extended handle and configured to support a camera and one or more illumination panels;
    said camera and said one or more illumination panels oriented to capture one or more images of a tire surface when said trigger is placed in operational position;
    said captured one or more images of a tire surface stored within an electronic storage element within said device and transmitted from said device to a data processor external to said device;
    said captured one or more images of a tire surface analyzed to determine a plurality of tire metrics;
    said captured one or more images of a tire surface and determined plurality of tire metrics displayed to a technician on said electronic display unit.

2. The device of claim 1, where said first distancing arm and/or said second distancing arm are placed in contact with an exterior surface of a tire prior to image capture.

3. The device of claim 1, where said shade panel and said first spacing arm and said second spacing arm are connected in a substantially triangular orientation where said spacing arms provide support for said shade panel and said first and second distancing arms.

4. The device of claim 1, where said first spacing arm and said second spacing arm position said first distancing arm and/or second distancing arm against a tire surface to establish a predetermined orientation and distance to the surface of said tire.

5. The device of claim 1, where said electronic control unit comprises one or more LED light assemblies, a right IR imager, a left IR imager, and an Red, Green, Blue (RGB) camera.

6. The device of claim 5, where said LED light assemblies comprise RGB LED lights, white LED lights, IR LED lights, or any combination thereof.

7. The device of claim 1, further comprising an embedded computer having a data processor, control electronics, one or more displays, a battery or other power connector, a Near Field Communication (NFC) interface, and one or more USB ports contained within said electronic control and electronic display unit.

8. The device of claim 7, further comprising a wireless communication capacity to exchange data and commands with an external system server utilizing a smartphone, a cellphone network, a computer network, or combinations thereof.

9. The device of claim 1, further comprising an application software module within said data processor controlling said LED light assemblies, controlling the positioning of said distancing arms, capturing said one or more images of a tire surface, analyzing said captured tire surface images, overlaying said analysis on said images as graphics and text information of tire surface metrics to create result images, and presenting said result images on said electronic display unit.

10. The device of claim 1, where said electronic display unit further comprises displaying control information, operational status, or other system information in addition to image information.

11. The device of claim 1, where the device further comprises a swivel joint operable to change the viewing angle of said electronic display.

12. The device of claim 1, where the trigger is formed as a contoured grip that is adapted to be held by an operator while the device is in operation.

13. The device of claim 9, where the application software module further comprises a machine learning system to train the device on common and repeatable operations.

14. The device of claim 1, where each LED light assembly is protected by a covering window that is transparent to the light emitted by each of said LED light assemblies.

* * * * *